US005712850A

United States Patent [19]

Elia et al.

[11] Patent Number: 5,712,850

[45] Date of Patent: Jan. 27, 1998

[54] SYSTEM FOR DIGITAL BROADCASTING BY SATELLITE

[75] Inventors: Carlo Elia, Oegstgeest; Enrico Colzi, Rijnsburg, both of Netherlands

[73] Assignee: Agence Spatiale Europeenne, Paris, France

[21] Appl. No.: 509,061

[22] Filed: Jul. 31, 1995

[30] Foreign Application Priority Data

Jul. 29, 1994 [FR] France .................................... 94 09438

[51] Int. Cl.[6] ................................ H04B 7/185; H04J 3/00

[52] U.S. Cl. ............................ 370/326; 370/538; 348/385

[58] Field of Search ................................ 370/84, 79, 112, 370/97, 104.1, 50, 95.1, 95.3, 316, 321, 325, 326, 324, 537, 538, 540, 323; 455/12.1, 13.1, 13.2, 13.3; 348/385, 387, 423, 465, 723; 371/35, 37.4, 37.5

[56] References Cited

U.S. PATENT DOCUMENTS

| | | | |
|---|---|---|---|
| 4,145,573 | 3/1979 | Arnold . | |
| 4,425,639 | 1/1984 | Acampora et al. | 370/95.1 |
| 4,748,622 | 5/1988 | Muratani et al. | 370/104.1 |
| 4,763,129 | 8/1988 | Perrotta | 370/104.1 |
| 5,231,494 | 7/1993 | Wachob | 348/385 |
| 5,430,492 | 7/1995 | Dambacher | 348/723 |
| 5,473,601 | 12/1995 | Rosen et al. | 455/12.1 |
| 5,506,903 | 4/1996 | Yamashita | 370/79 |

FOREIGN PATENT DOCUMENTS

| | | |
|---|---|---|
| 0306918 | 3/1989 | European Pat. Off. . |
| 3200249 | 8/1982 | Germany . |
| 4034979 | 5/1992 | Germany . |
| 2232561 | 12/1990 | United Kingdom . |

*Primary Examiner*—Chau Nguyen
*Attorney, Agent, or Firm*—Sughrue, Mion, Zinn, Macpeak & Seas, PLLC

[57] ABSTRACT

The invention relates to a system for digital broadcasting by satellite and including a link sending digital information to the satellite, the satellite retransmitting a broadcast multiplex. According to the invention, the link includes a plurality of individual transmitters each of which transmits a transmission signal at a first rate corresponding to at least one program, and wherein the satellite includes an onboard multiplexer module combining the transmission signals to form the transmission multiplex at a second rate higher than the first rate.

17 Claims, 9 Drawing Sheets

Ep

SAT

SYSTEM FOR DIGITAL BROADCASTING BY SATELLITE

The present invention relates to a system for digital broadcasting by satellite, the system comprising a link sending digital information to the satellite, and said satellite retransmitting a broadcast multiplex.

BACKGROUND OF THE INVENTION

The DTVB standard for television broadcasting by satellite is described in the European Broadcasting Union Publication of Jan. 1994, entitled "Specification of the 'Baseline modulation/channel coding system' for digital multiprogram television by satellite"(V4/MOD-B, DTVB 1110, GT V4/MOD 252).

That standard implements multiprogram satellite transmission using the MPEG-2 standard for audio and video compression and multiplexing. For a definition of the MPEG-2 standard, reference may be made to the International Standards Organization (ISO) publication entitled "MPEG-2 systems working draft" (ISO/IEC JTC1/SC20/WG11, NO501, MPEG93, Jul. 1993).

The DTVB standard implicitly assumes that the various television channels are conveyed to a single terrestrial station for multiplexing. The multiplexed data stream, referred to as the "transport stream" is then transmitted to the satellite over a common up link after redundancy information has inserted for signal protection purposes.

This requires each television channel to be transported to a common up link, also referred to as a contribution link, and gives rise to extra costs resulting firstly from the need to set up the contribution link terrestrial station and secondly from the need to convey signals to said terrestrial station from the various terrestrial transmitters.

OBJECTS AND SUMMARY OF THE INVENTION

An object of the present invention is to provide a system enabling said contribution link to be omitted, in particular in the context of using a satellite to implement digital TV program broadcasting for reception directly in the home of the user.

The invention thus provides a system for digital broadcasting by satellite, the system including a link sending digital information to the satellite, said satellite retransmitting a broadcast multiplex, wherein the link includes a plurality of individual transmitters each of which transmits a transmission signal at a first rate corresponding to at least one program, and wherein the satellite includes an onboard multiplexer module combining said transmission signals to make up said broadcast multiplex at a second rate that is higher than the first rate.

Thus, implementation of the invention requires no more than adding a multiplexer module in the satellite.

At least one such individual transmitter may be a ground station. Thus, each ground station transmits directly to the satellite which makes it possible to omit the contribution link. There is no need for all of the individual transmitters to be ground stations.

The link from the transmitter to the satellite is advantageously a multiplex link conveying a multiplex transmission signal which is preferably an analog signal that is modulated, preferably phase-modulated, to convey said digital information. The multiplex signal advantageously comprises packets, each conveying information belonging to a single program.

It is advantageous for at least one individual transmitter to include a transport multiplexer that multiplexes at least audio and video signals. An individual transmitter may include a channel adaptation generator for generating at least one channel adaptation block of a first type that does not require information to be interchanged between different programs. This adaptation block of the first type may, for example, be a scrambler block and/or an outer encoding block.

At least one individual transmitter may include a device for receiving the broadcast multiplex and a device for extracting a clock therefrom so as to provide a clock signal to the individual transmitter. This makes it simple to obtain a clock that does not drift relative to the satellite clock which is used, inter alia, for driving the multiplexer module.

In a preferred embodiment, the onboard multiplexer module comprises in succession:

1 ) a plurality of parallel-connected branches, each of which receives on its input an analog signal demultiplexed by an analog demultiplexer, each parallel branch comprising in succession:
   a) a bandpass filter;
   b) an analog-to-digital converter;
   c) a demodulator demodulating the baseband; and
   d) a buffer memory connected to an input of an onboard multiplexer;
2) said onboard multiplexer;
3) a digital-to-analog converter;
4) a modulator for modulating the analog signal provided by the digital-to-analog converter; and
5) a mixer providing a multiplexed satellite broadcast signal.

Advantageously, downstream from the onboard multiplexer and upstream from the digital-to-analog converter, the multiplexer module includes a channel adaptation generator generating at least one channel adaptation block of a second type requiring information to be interchanged between different programs. An adaptation block of the second type may, for example, be an interlace block and/or an inner encoding block.

The modulator for modulating said analog signal is advantageously a multi-phase modulator, preferably a four-phase modulator (0°, 90°, 180°, 270°), with each symbol representing a dibit (QPSK).

BRIEF DESCRIPTION OF THE DRAWINGS

Other characteristics and advantages of the invention appear more clearly on reading the following description given by way of non-limiting example and made with reference to the accompanying drawings, in which.

MORE DETAILED DESCRIPTION

Figure 1:
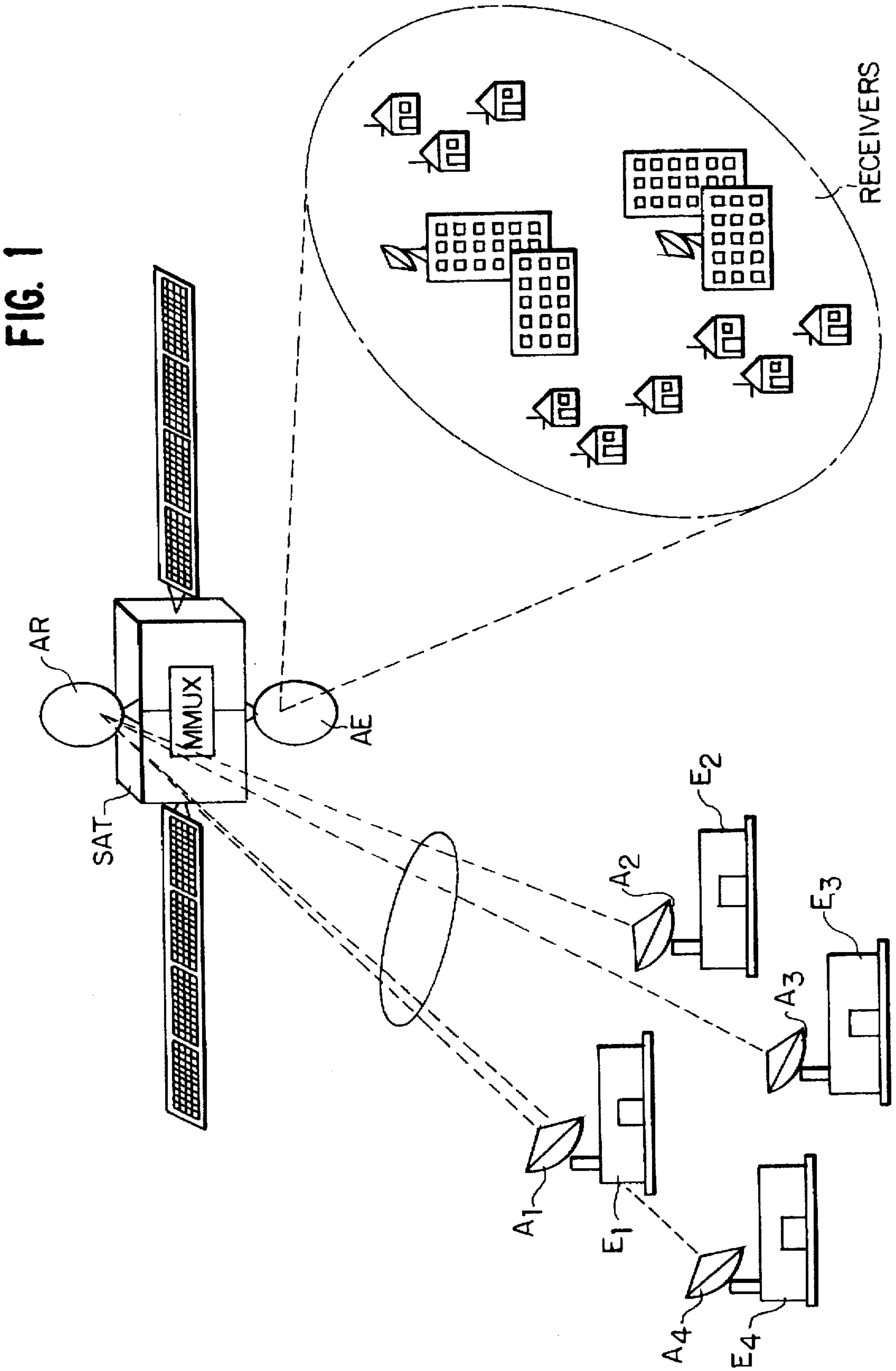
FIG. 1 is a diagram showing how a system of the invention operates.

In FIG. 1, a transmission system of the invention comprises a certain number of ground stations $E_1$, $E_2$, $E_3$, $E_4$, etc. . . . provided with transmission antennas $A_1$, $A_2$, $A_3$, $A_4$, etc. . . . each transmitting at a "low" rate to a satellite SAT, which satellite receives all of these transmissions via a single reception antenna AR. In this system, the stations $E_1$, $E_2$, $E_3$, $E_4$, etc. . . . which are located on the ground in different geographical locations send their signals independently of one another to the satellite SAT which acts as a transponder for broadcasting one or more digital television programs. Each ground station $E_1$, $E_2$, $E_3$, $E_4$, etc. . . . transmits a signal corresponding to at least one television program. A multiplex module MMUX integrated in the architecture of the satellite SAT processes the signals received by the reception antenna AR from the ground stations $E_1$, $E_2$, $E_3$, $E_4$, etc. . . . so as to generate a single multiplex signal which is transmitted by the transmission antenna AE to terrestrial receivers for individual users or for groups of users (e.g. an appartment block) provided with satellite reception antennas. The signal transmitted by the broadcast antenna AE of the satellite SAT comprises a multiprogram television signal in which the transmissions from the ground stations $E_1$, $E_2$, $E_3$, $E_4$, etc. . . . or from only some of them are multiplexed.

The down link constituted by transmission from the broadcast antenna AE is preferably implemented using the above-mentioned DTVB satellite television broadcast standard.

Using the system of the invention, the prior art contribution link is not required.

The up links $E_1$, $E_2$, $E_3$, $E_4$, etc. . . . transmit signals that comply with the MPEG-2 standard whereby audio, video, and optionally data signals are multiplexed and compressed to form a packetized elementary stream.

Figure 2:
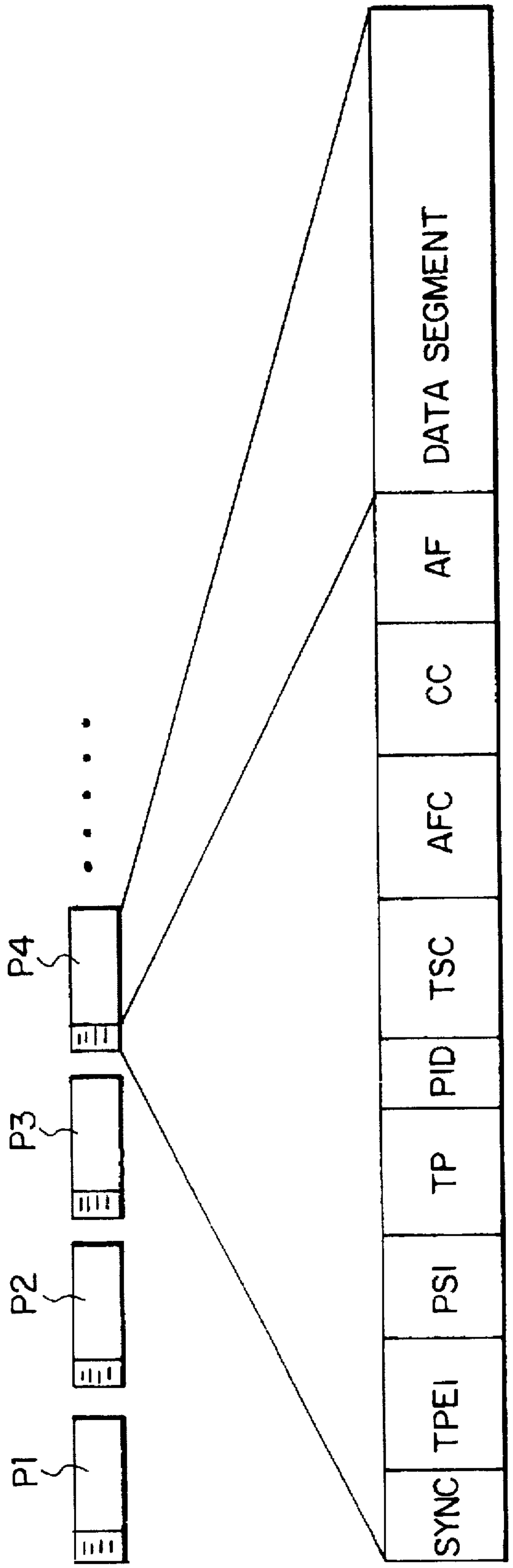
FIG. 2 PRIOR ART
FIG. 2 shows a digital transport stream in accordance with the MPEG-2 standard.

The MPEG-2 transport stream is shown in FIG. 2. It comprises a succession of packets P1, P2, P3, P4, etc. . . . . A packet compact comprises a data segment PES which contains the above-mentioned video, audio, and data information, and which is preceded by a header that comprises in succession: a synchronization multiplet SYNC, generally an 8-bit byte; a transport packet error indicator segment TPEI, a packet start indicator segment PSI; a transport priority indicator segment TP; a segment PID; a transport scrambling control segment TSC; an adaptation field control segment AFC; a continuity counter segment CC; and an adaptation field AF. For further details, reference may be made to the definition of the MPEG-2 standard.

In systems using the MPEG-2 standard, it could be envisaged, for example, that the ground stations $E'_1$, $E'_2$, $E'_3$, $E'_4$, etc. . . . transmit their video information $V'_1$, $V'_2$, $V'_3$, $V'_4$, etc. . . . , audio information $A'_1$, $A'_2$, $A'_3$, $A'_4$, etc. . . . and data $D'_1$, $D'_2$, $D'_3$, $D'_4$, etc. . . . to a transport multiplexer TRMUX forming part of the contribution link LC located on the ground and transmitting the multiplex to the satellite which then does no more than rebroadcast it unchanged to be picked up by domestic users.

Figure 4:
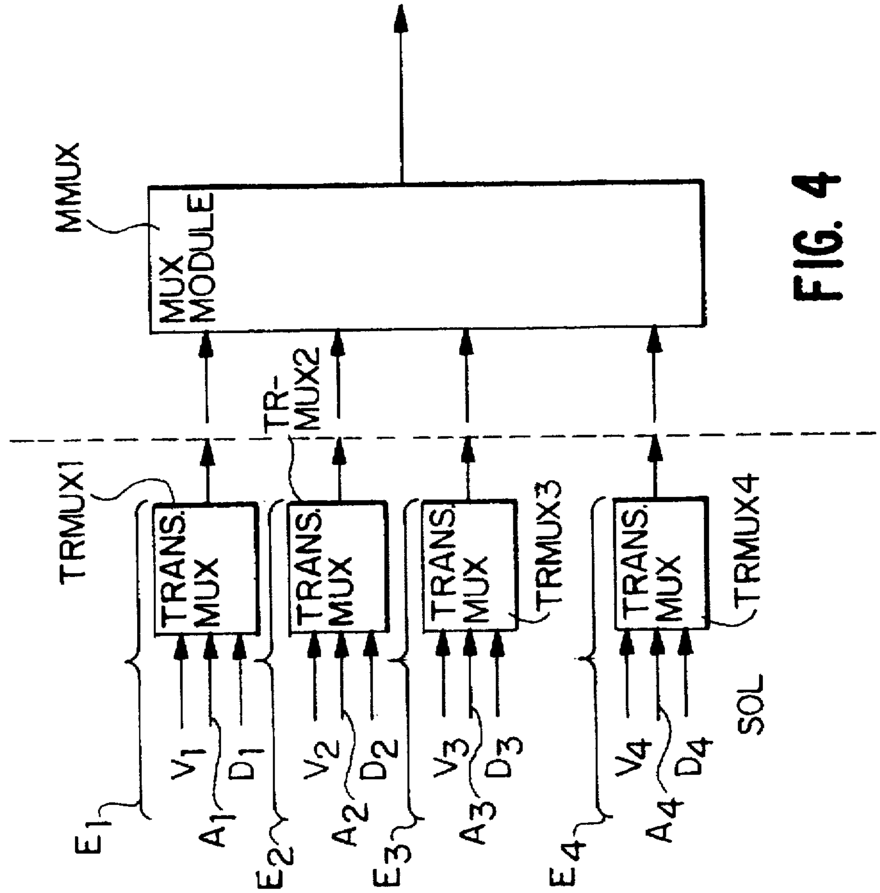
FIG. 4 shows transmission performed in accordance with the invention, i.e. without a contribution link.

In the configuration of the invention as shown in FIG. 4, each transmitter $E_1$, $E_2$, $E_3$, $E_4$, etc. . . . provided with its own transport multiplexer TRMUX1, TRMUX2, TRMUX3, TRMUX4, etc. . . . which multiplexes the video, audio, and data information respectively $V_1$, $A_1$, $D_1$ for transmitter $E_1$; $V_2$, $A_2$, $D_2$ for transmitter $E_2$; $V_3$, $A_3$, $D_3$ for transmitter $E_3$; and $V_4$, $A_4$, $D_4$ for transmitter $E_4$, etc. . . . . Each of these multiplexed signals is transmitted via the antennas $A_1$, $A_2$, $A_3$, $A_4$, etc. . . . to the satellite SAT in which they are processed by the multiplexer module MMUX to produce the broadcast multiplex combining the programs corresponding to each of the transmitters $E_1$, $E_2$, $E_3$, $E_4$, etc. . . . to be received by the antennas of the receivers of domestic users.

Figure 3:
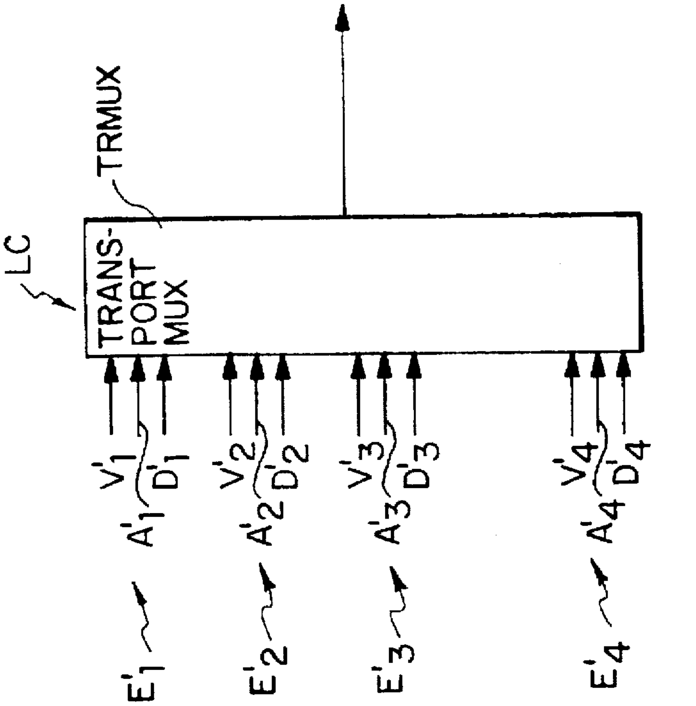
FIG. 3 PRIOR ART
FIG. 3 shows a known configuration implementing a contribution link.

Each transport packet carries information concerning a single program. Transport multiplexer of rank P, $TRMUX_p$, performs a certain number of functions to enable it to calculate the values to be inserted in the packet header. It generates the header and it adds, where appropriate, sufficient PES data to pad out to a length of 188 bytes. The transport multiplexer $TRMUX_p$ operates at a data rate that is slower than the transport multiplexer TRMUX incorporated in the contribution link LC of FIG. 3. For television type transmission, the data rate is known and remains stable for a given program, thus making it possible to generate transport packets channel by channel, as shown in FIG. 4.

Given that there is no need to interchange information between the transport multiplexers $TRMUX_p$ located in the individual transmitters $E_1$, $E_2$, $E_3$, $E_4$, etc. . . . , these multiplexers may be located separately on the ground in each of the transmission stations, while the multiplexer module MMUX is incorporated in the architecture of the satellite.

In addition, it is advantageous to limit the functions performed by the multiplexer MMUX as much as possible. It is more advantageous to retain a maximum amount of functions in the terrestrial stations even if that means increasing the effective isotropic radiated power ("EIRP") rather than having a complete MPEG-2 multiplexer on board the satellite.

Figure 5:
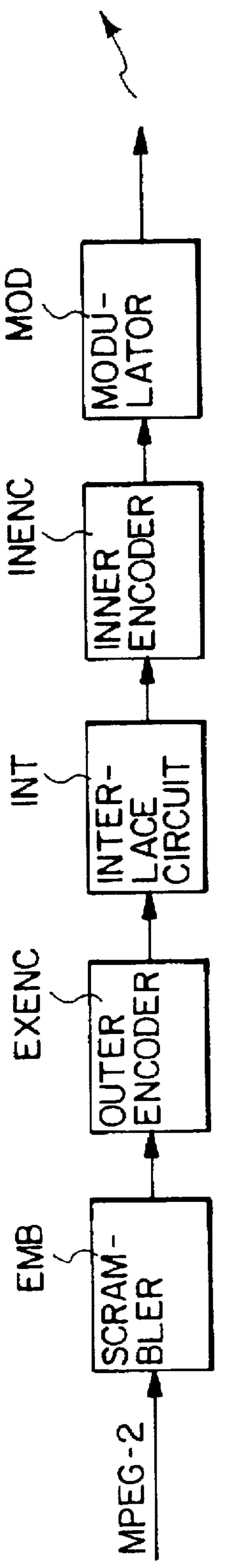
FIG. 5 PRIOR ART
FIG. 5 is a block diagram showing channel adaptation that is known per se.
Figure 6:
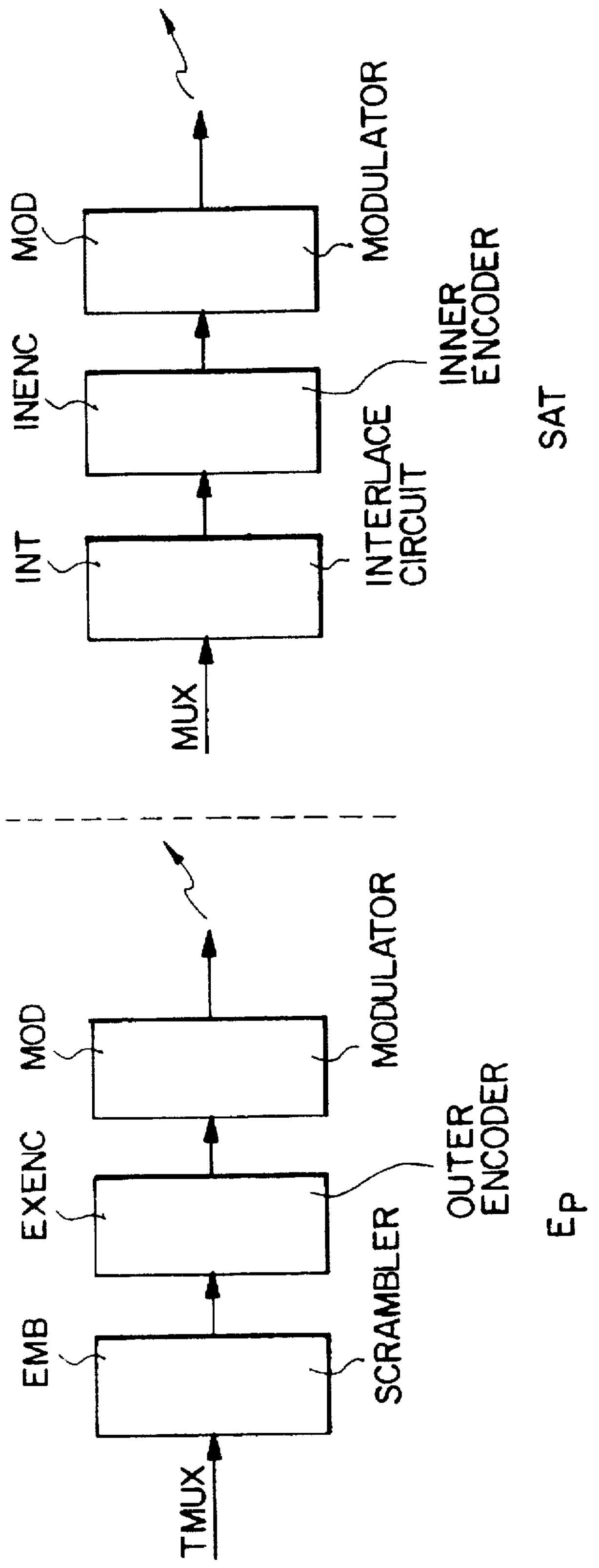
FIG. 6 shows modified channel adaptation in a preferred embodiment of the invention.

This is illustrated in FIGS. 5 and 6.

FIG. 5 is a block diagram showing channel adaptation in accordance with the MPEG-2 standard and known per se. This channel adaptation consists firstly in a scrambling function performed by a scrambler EMB to disperse or spread energy, followed by outer encoding performed by an outer encoder EXENC, interlacing performed by an interlacing circuit INT, inner encoding performed by an inner encoder INENC, and finally modulation such as quaternary phase shift keying (QPSK) performed by a modulator MOD, the signal leaving the modulator MOD then being suitable for sending to the transmission antenna AE of the satellite SAT.

This adaptation has the known function of protecting the down link for reception by a domestic user against faults in the satellite channel.

According to the invention, a certain number of channel adaptation blocks are located in the ground stations $E_1$, $E_2$, $E_3$, $E_4$, etc. . . . . These blocks are those which perform functions that, as put forward by the Applicant, do not require mutual interchange of information between the various programs. Thus, the functions of scrambling and of outer encoding can be placed on the ground whereas the functions of interlacing and of inner encoding remain on board the satellite SAT.

In addition, given that the ground stations perform outer encoding EXENC, this provides protection against up link errors with the result of reducing the effective isotropic radiated power EIRP of the ground stations.

Figure 7:
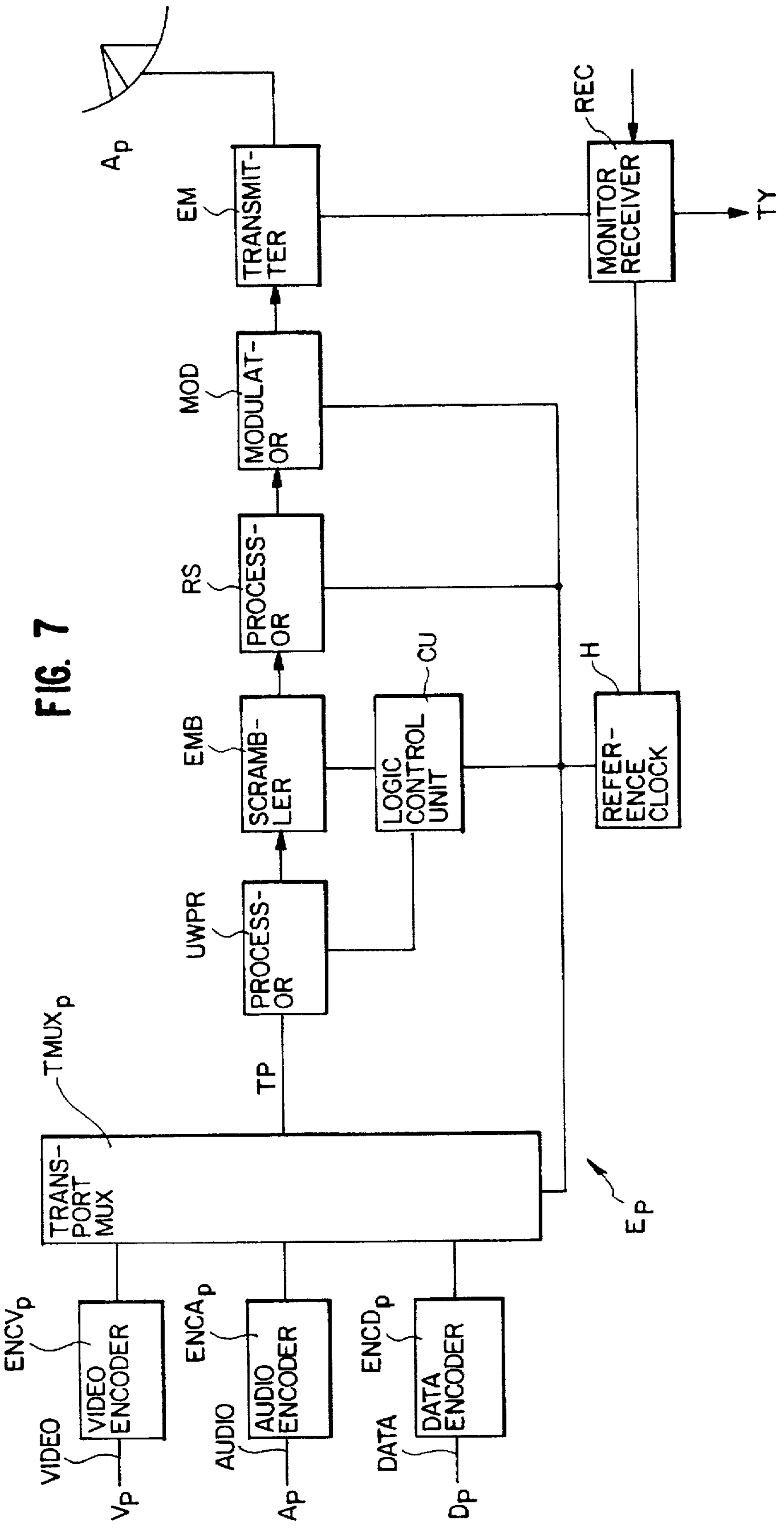
FIG. 7 is a block diagram of an up link in a preferred embodiment of the invention.

The block diagram of a transmitter $E_p$ is given in FIG. 7. It comprises a video encoder $ENCV_p$ for video signals $V_p$, an audio encoder $ENCA_p$ for audio signals $A_p$, and a data encoder $ENCD_p$ for data $D_p$, each providing packets PES to a corresponding inlet of a transport multiplexer $TMUX_p$. Video, audio and data information are compressed in conventional manner in all three of the above-specified encoders. Given that channel allocation is fixed or almost fixed, there is no need to collect other PES data from other channels feeding the same satellite. Consequently, the transport multiplexer $TMUX_p$ generates the header which corresponds to processing the PES data at its inputs, i.e. corresponding to a single channel relevant thereto, and it produces the transport packet TP in MPEG-2 format.

The processor UWPR inverts the sign of the single header word of the packet in compliance with the DTVB framing organization standard.

The logic control unit CU controlled by a reference clock H supervises this inversion and also the energy spreading process which is performed by the scrambler unit EMB. Inner encoding is performed by a processor RS implementing a Reed-Solomon code using the parameters (204, 188, 8). This Reed-Solomon encoding is performed before the QPSK modulation implemented by the modulator MOD and transmission performed by the transmitter EM.

The carrier frequency of the signal transmitted by the antenna $A_p$ does not require frequency stability of better than 10 parts per million (ppm). It is therefore possible to use a local oscillator. However, given that any such transmission station $E_p$ generally includes a monitor receiver REC, advantage is taken of the existence of the receiver REC to extract a system clock from the down signal delivered by the satellite SAT so as to lock the reference clock H which feeds not only the control unit CU, but also the modules RS, the multiplexer $TMUX_p$, and the modulator MOD.

As explained in greater detail below, it will be observed that in the multiplexer module MMUX on the satellite SAT, buffer memories are used upstream from the on board multiplexer to enable residual errors and Doppler phenomenon errors to be corrected prior to multiplexing and broadcasting by the antenna AE.

Figure 8:
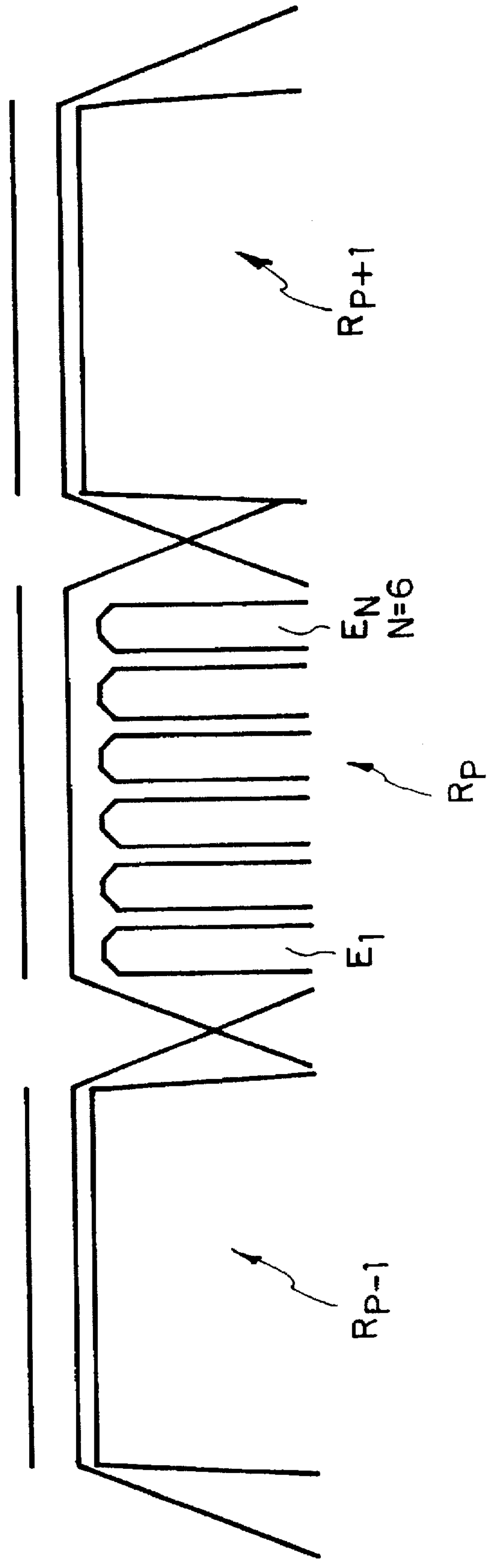
FIG. 8 shows how an up link is subdivided into channels in the invention.

FIG. 8 shows the channel distribution of the satellite SAT. A group of N transmitter stations $E_p$ (where N=6) share a satellite transponder $R_p$ in the frequency domain (FDMA). The total capacity of the transponder is shared equally between the stations. In other words, if $R_d$ megabits per second (Mb/s) are available on the down link, i.e. for broadcasting by the satellite, then each station $E_p$ transmits $R_u=R_d/N$ Mb/s. Resource allocation is generally static, i.e. a station is entitled to transmit only over a particular frequency allocated thereto.

For example, FIG. 8 shows a satellite having a plurality of transponders each having a passband of 33 MHz and each allocated to broadcasting multiprogram digital TV. One of the transponders $R_p$ has six carriers corresponding to the six transmitters $E_p$, each occupying a band of about 5 MHz, and each delivering at a rate $R_u$ of six Mb/s for a total information rate in the down link $R_d$=36 Mb/s.

Figure 9:
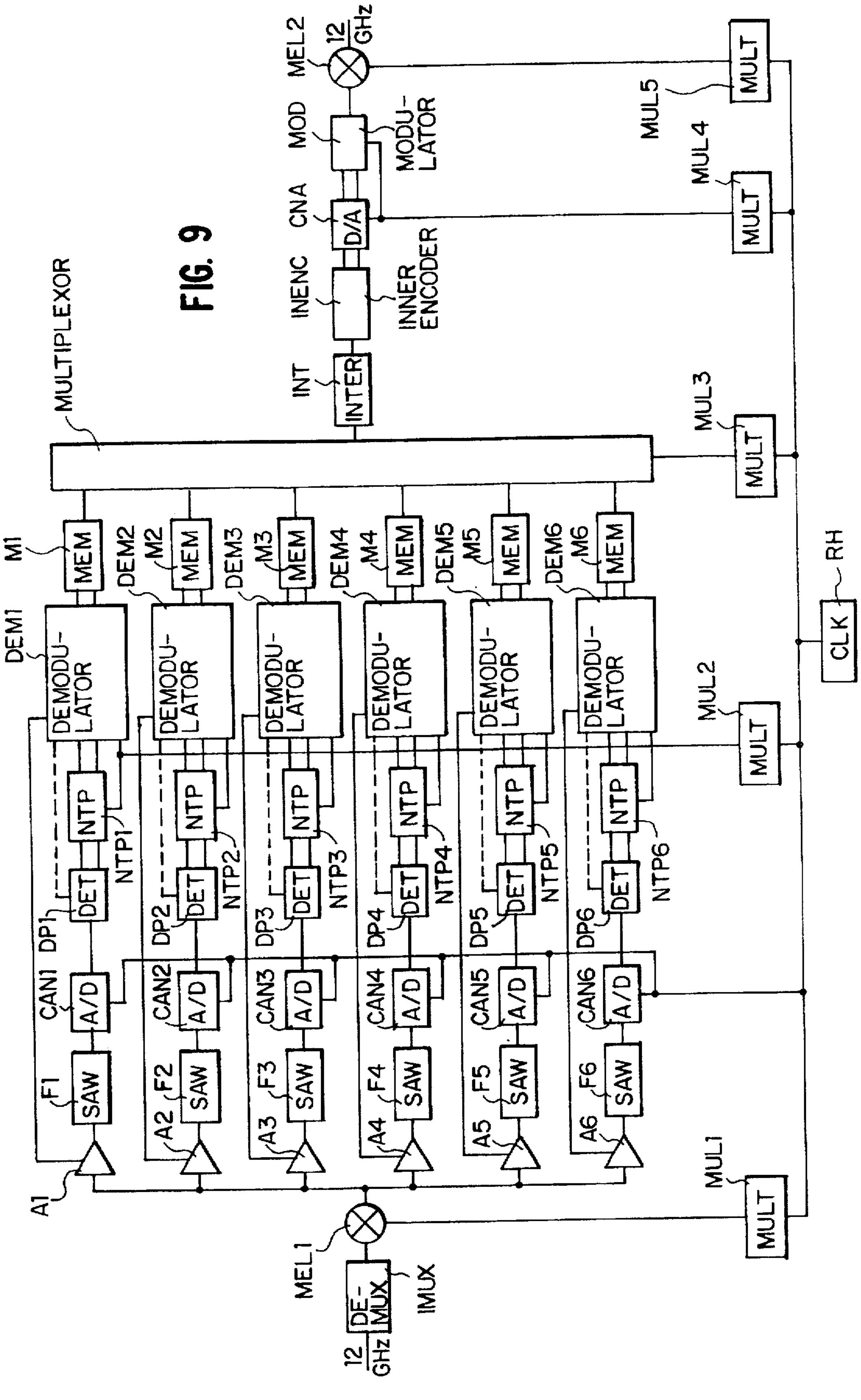
FIG. 9 is a block diagram of an onboard multiplexer block in a preferred embodiment of the invention.

FIG. 9 is a block diagram of the onboard multiplexer module MMUX. The 12 GHz signal delivered by the receiver antenna AR of the satellite SAT is applied to the input of an input demultiplexer IMUX which forms part of the architecture of the satellite and which is situated upstream from the multiplexer module MMUX proper.

At its input, the multiplexer module MMUX includes an input mixer MEL1 which receives on one input firstly the output signal from the input demultiplexer IMUX and on another input a signal delivered by a multiplexer MUL1 from an onboard reference clock RH. As shown in the example of FIG. 8, the multiplexer module is shown in a configuration that corresponds to six terrestrial transmitters. Consequently, the output signal from the mixer MEL1 is applied to the respective inputs of six amplifiers A1 to A6 whose outputs are fed to surface acoustic wave filters ("SAWs") respectively referenced F1 to F6. Such filters have the advantage of being compact, light in weight, and of having very good rejection characteristics. These filters are tuned to correspond to the six channels shown in FIG. 8. The output signals from the six filters F1 to F6 are then applied to the inputs of respective analog-to-digital converters referenced CAN1 to CAN6 and they are clocked by the reference clock RH. These analog-to-digital converters perform 8-bit conversion at a sampling frequency which is about double the passband of a carrier, i.e. 11 million samples per second for a passband of 5 MHz. It will be observed that conversion could also be performed with a 6-bit converter without quantization distortion being excessive. The outputs from the converters CAN1 to CAN6 are applied to the inputs of digital product detectors DP1 to DP6. These detectors convert the respective signals into the complex domain by applying the Hilbert transform in a manner that is well known in the field of digital processing. The signals provided by the detectors DP1 to DP6 are applied to the inputs of respective interpolation and filtering circuits NTP1 to NTP6. The purpose of interpolation is to make appropriate and accurate filtering possible. The filtering is performed by a filter FIR having finite impulse response, i.e. a non-recursive digital filter. Interpolation and adaptive filtering are controlled by the clock signal delivered by the clock RH with frequency being multiplied by four in the multiplier circuit MUL2. The signals provided by the circuits NTP1 to NTP6 are then demodulated into baseband by a corresponding number of demodulators DEM1 to DEM6 respectively which operate in conventional manner to perform coherent demodulation of the quaternary phase shift keyed signals. They include means for recovering digital phase and clock rate. The demodulators advantageously include respective signal level detectors enabling a lowpass filter to be controlled to achieve an automatic control loop for the gain of the amplifiers A1 to A6 so as to make best use of the capabilities of the analog-to-digital converters CAN1 to CAN6.

Buffer memories M1 to M6 are interposed between the demodulators DEM1 to DEM6 and the onboard multiplexer.

The onboard multiplexer performs the following functions:

sequential multiplexing of the packets provided by the memories M1 to M6; and inserting "filler" packets in the event of one or more of the up links operating badly. A special flag provided in the packet header can be used to warn the receiver on the ground.

The multiplexer is clocked by the clock RH whose frequency is multiplied by a multiplier MUL3.

The output signals from the onboard multiplexer are fed in succession to:

an interlacing circuit INT which performs interlacing by convolution in application of the DTVB standard. Interlacing depth is 12 bytes and its structure corresponds to operation in Forney mode. It requires a 9000-bit internal memory;

- an inner encoder INENC which performs convolution encoding, likewise in application of the DTVB standard. Its structure is relatively simple;
- a digital-to-analog converter CNA of the sigma-delta type with a conversion rate of about 26 MHz;
- a modulator MOD to perform quaternary phase shift keying (QPSK). In baseband, it has two raised cosine filters and it also performs conversion to an intermediate frequency $f_{IF}$; and
- a mixer MEL2 to which a multiplier circuit MUL5 delivers a signal at 12 GHz derived from the reference clock RH.

Figure 10:
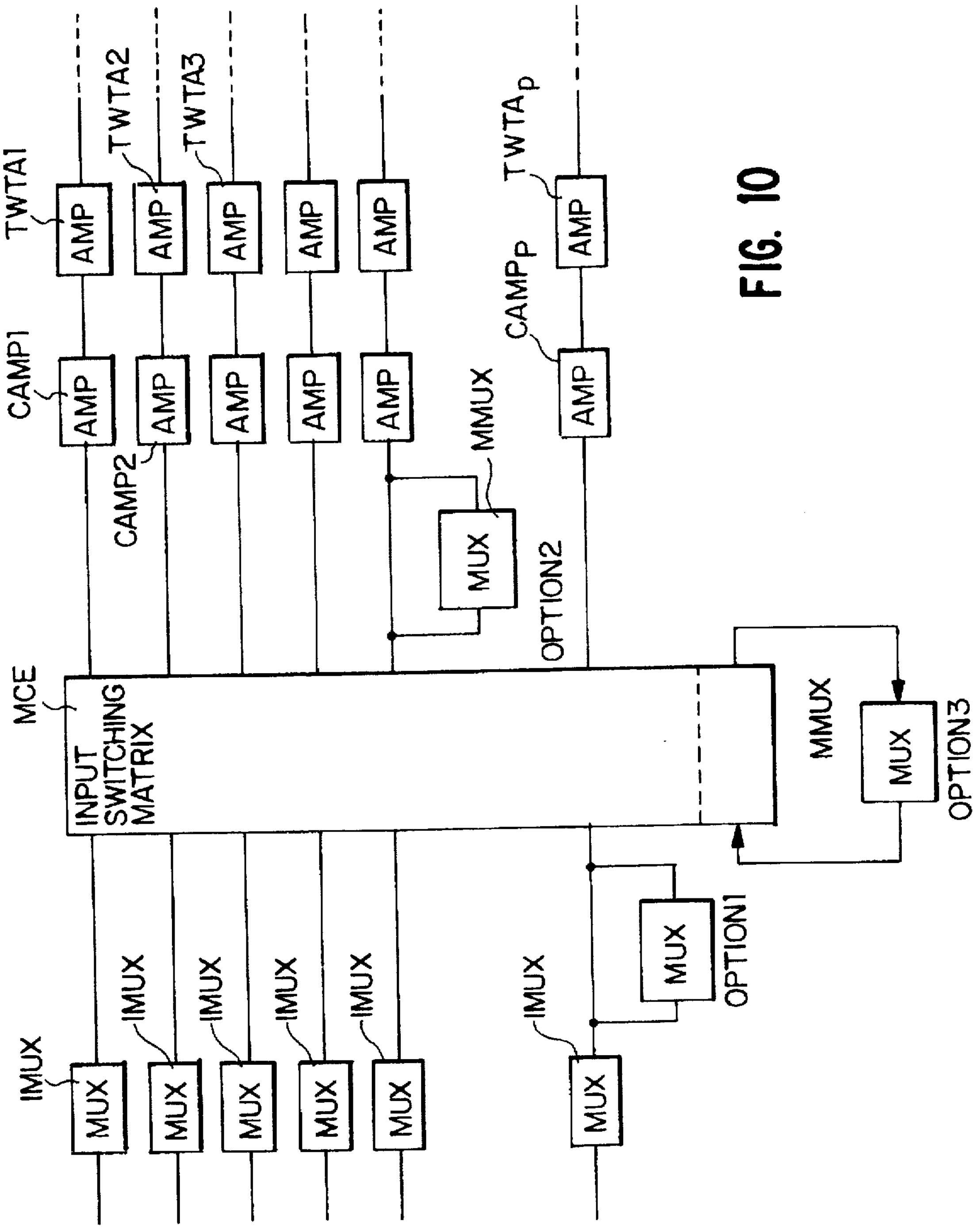
FIG. 10 shows various ways in which the multiplexer module can be configured in the architecture of the satellite.
Figure 11:
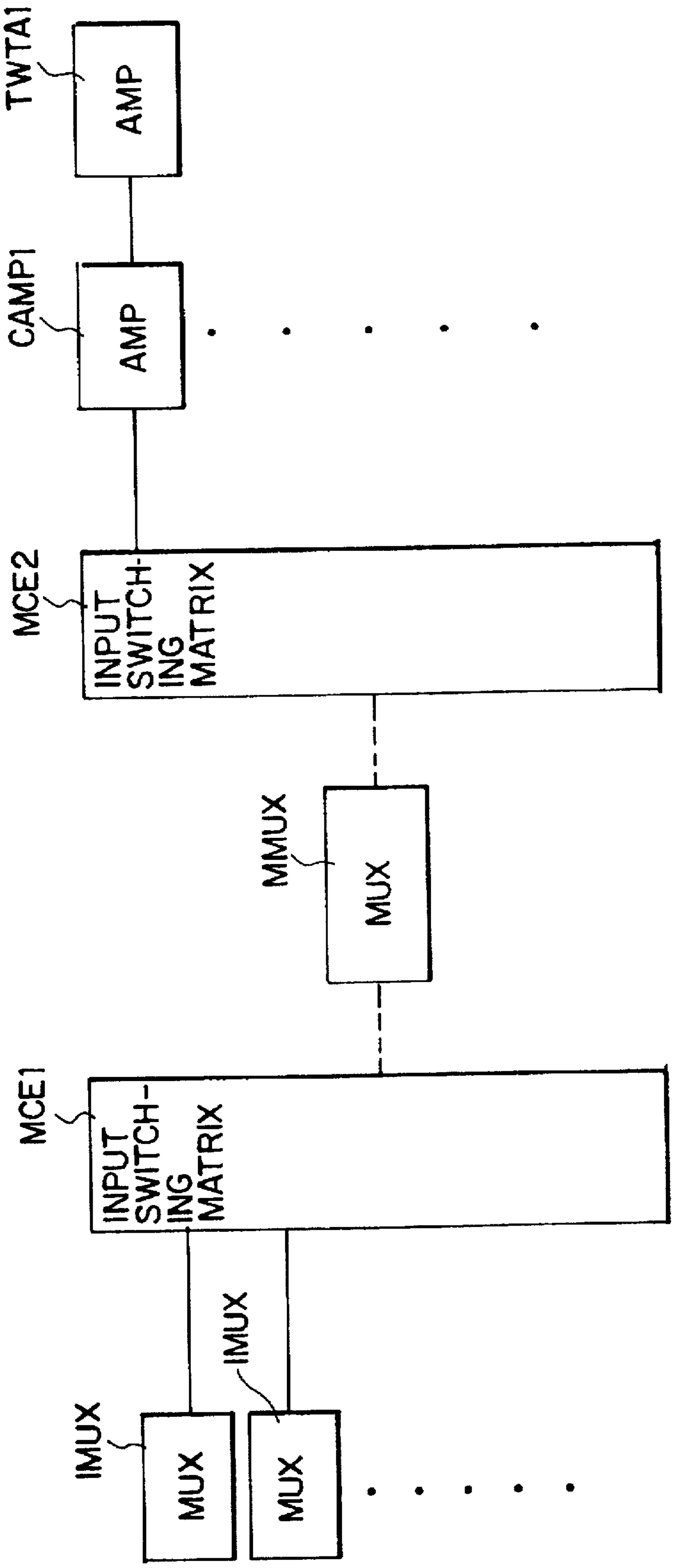
FIG. 11 shows a preferred embodiment of FIG. 10.

The multiplexer module MMUX may be located:

- either directly after an input multiplexer IMUX as shown in FIG. 9 and in FIG. 10 (option 1). In this case, in the event of a travelling wave tube amplifier $TWTA_p$ used for retransmission by the antenna AE being subject to failure, the signal may be applied to another TWTA amplifier, but it is not possible to perform frequency reallocation since the module MMUX is associated with a particular input multiplexer IMUX; or
- after the input switching matrix MCE and before the amplifier $CAMP_p$ feeding the power amplifier $TWTA_p$ (option 2). In this case, a new frequency allocation is possible because of the MCE network which can allocate signals from any input multiplexer to the module MMUX; or else
- at the matrix MCE (option 3) making it possible both to perform new frequency allocation and to change TWTA amplifier; however this requires the matrix MCE to be adapted, e.g. by being doubled up as a matrix MCE1 upstream from the module MMUX and as a matrix MCE2 downstream from the module MMUX.

The case shown relates to a satellite SAT having a single module MMUX. Naturally, it is possible for one or more other transponders of the satellite to be allocated to reception of this type and for them consequently to be associated with respective multiplexer modules MMUX.

We claim:

1. A system for digital broadcasting by satellite, the system including an uplink sending digital information to the satellite, wherein said satellite retransmits a broadcast multiplex signal to a plurality of ground receivers, wherein said uplink includes a plurality of individual ground transmitter stations, each of which transmits a transmission signal at a first rate, wherein the transmission signal from each of said individual ground transmitter stations is a multiplexed transmission signal carrying digital information corresponding to at least one program, wherein the satellite includes an onboard multiplexer module combining said transmission signals to make up said broadcast multiplex signal at a second rate that is higher than the first rate, wherein at least one individual ground transmitter station includes a transport multiplexer multiplexing at least audio and video signals which correspond to one transmission signal of said transmission signals, and wherein said onboard multiplexer module includes an onboard channel adaptation generator of a first type requiring information to be interchanged between different programs and containing an onboard channel adaptation block.

2. A system according to claim 1, wherein the multiplex transmission signal of each of said individual ground transmitter stations is an analog signal modulated to transport said digital information.

3. A system according to claim 1, wherein the multiplex signal from each of said individual ground transmitter stations includes packets, each of which transports information belonging the one program only.

4. A system according to claim 1, wherein said at least one individual ground transmitter station includes a ground channel adaptation generator of a second type that does not require information to be interchanged between different programs and that contains a ground channel adaptation block.

5. A system according to claim 4, wherein said ground channel adaptation block is a scrambler block.

6. A system according to claim 5, wherein said ground channel adaptation generator further contains an outer encoding block.

7. A system according to claim 6, wherein said onboard channel adaptation block is an interlace block.

8. A system according to claim 6, wherein said onboard channel adaptation block is an inner encoding block.

9. A system according to claim 4, wherein said ground channel adaptation block is an outer encoding block.

10. A system according to claim 1, wherein the at least one individual ground transmitter station includes a receiver device for receiving the broadcast multiplex signal, and a clock extraction device providing a clock signal to the at least one individual ground transmitter station based on the broadcast multiplex signal.

11. A system according to claim 1, wherein said onboard channel adaptation block is an interlace block.

12. A system according to claim 1, wherein said onboard channel adaptation block is an inner encoding block.

13. A system for digital broadcasting by satellite, the system including an uplink sending digital information to the satellite, wherein said satellite retransmits a broadcast multiplex signal to a plurality of ground receivers, wherein said uplink includes a plurality of individual ground transmitter stations, each of which transmits a transmission signal at a first rate, wherein the transmission signal from each of said individual ground transmitter stations is a multiplexed transmission signal carrying digital information corresponding to at least one program, wherein the satellite includes an onboard multiplexer module combining said transmission signals to make up said broadcast multiplex signal at a second rate that is higher than the first rate, wherein the multiplexer module comprises, in succession:

1) a plurality of parallel-connected branches, each of which receives on its input an analog signal demultiplexed by an analog demultiplexer, each parallel branch comprising in succession:
   a) a filtering and converting module comprising a bandpass filter and an analog-to-digital converter;
   b) a demodulator demodulating a baseband; and
   c) a buffer memory connected to an input of an onboard multiplexer;
2) said onboard multiplexer;
3) a digital-to-analog converter;
4) a modulator for modulating the analog signal provided by the digital-to-analog converter; and
5) a mixer providing a multiplexed satellite broadcast signal.

14. A system according to claim 13, wherein downstream from the onboard multiplexer and upstream from the digital-to-analog converter, the multiplexer module includes an onboard channel adaptation generator of a first type requiring information to be interchanged between different programs and containing an onboard channel adaptation block.

15. A system according to claim 14, wherein said onboard channel adaptation block is an interlace block.

16. A system according to claim 15, wherein said onboard channel adaptation generator further contains an inner encoding block.

17. A system according to claim 14, wherein said onboard channel adaptation block is an inner encoding block.

* * * * *